(No Model.)

E. DILLINGHAM.
TEA STRAINER.

No. 489,468.  Patented Jan. 10, 1893.

WITNESSES
Frank G. Parker
Galen Coffin

INVENTOR
Edward Dillingham

UNITED STATES PATENT OFFICE.

EDWARD DILLINGHAM, OF CHELSEA, MASSACHUSETTS.

TEA-STRAINER.

SPECIFICATION forming part of Letters Patent No. 489,468, dated January 10, 1893.

Application filed October 17, 1892. Serial No. 449,058. (No model.)

*To all whom it may concern:*

Be it known that I, EDWARD DILLINGHAM, of Chelsea, in the county of Suffolk and State of Massachusetts, have invented a new and useful Improvement in Tea-Strainers, of which the following, taken in connection with the accompanying drawings, is a specification.

Figure 1:
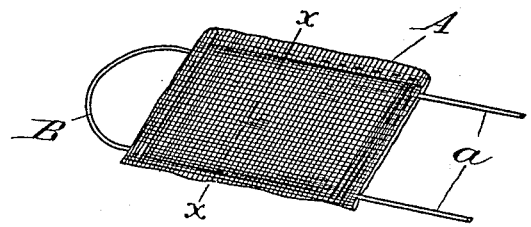
Figure 2:
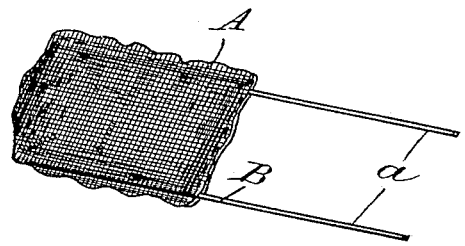
Figures 3, 4:
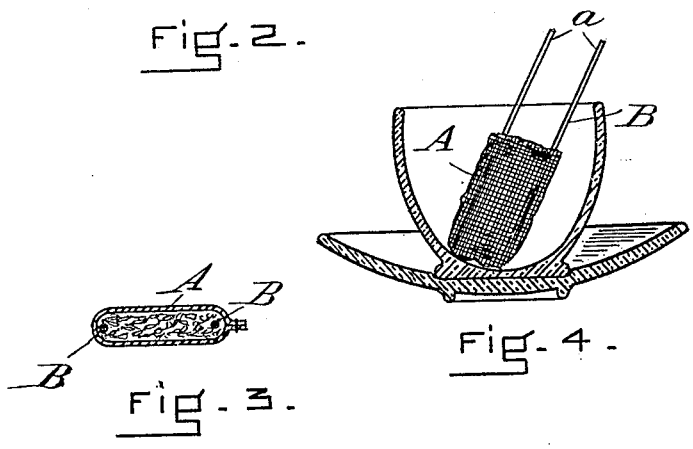

The object of my invention is to provide a compact pocket coffee and tea pad or bag. I attain this object as shown by the accompanying illustration. In which Figure 1 is an elevation of my pad or strainer. Fig. 2 is another view of the same. Fig. 3 is a cross section of Fig. 1 on line $x\,x$. Fig. 4 is a cross section of a cup, containing my pad or strainer.

My improved strainer is made in the form of a bag, one end of which is left open for the insertion of a quantity of coffee or tea. The open end is then closed, preferably by stitching. A wire formed with a loop at one end is then inserted through the closed bag as shown in Figs. 1, 2, 3, and 4. This pad is formed of strainer cloth woven fine enough to strain tea or coffee.

My improved strainer can be made very compact, containing enough coffee or tea to make one or more cups, and can be carried in the pocket or sent by mail if desired. It will be found very convenient for travelers.

The operation is as follows: The pad containing either coffee or tea is placed in the cup as shown in Fig. 4. Hot water is then poured on to the pad until the cup is nearly full. In a few minutes a clear extract is produced.

The pad or bag A can be drawn down to the looped end of the wire B, and immersed in the coffee or tea, if more strength is required. The pad drawn down to this position can be seen in Fig. 2.

I am aware that strainers have been made for straining coffee and tea, but not like mine, which is arranged to hold one or more portions of coffee or tea, according to the size of the pad. It is made in the form of a bag, with one end open; after the insertion of the material to be strained said end is closed. A wire bent into a loop at one end is then inserted lengthwise, the ends $a\,a$ serving as handles, as shown in Fig. 4.

Having thus described my invention, what I claim is:

1. As a new article of manufacture, a bag or pad formed of strainer cloth or any suitable material, into which is inserted longitudinally a wire with a loop and projecting ends $a\,a$, said bag or pad being adapted to hold one or more portions of coffee or tea, substantially as described and for the purpose set forth.

2. The herein described strainer, consisting essentially of a bag or pad A closed on all sides after the insertion of the material to be strained, said pad A being provided with a looped wire B adapted to hold the pad in its proper form, and the projecting ends $a\,a$ of the wire adapted to serve as a handle, substantially as described and for the purpose set forth.

In testimony whereof I have signed my name to this specification, in the presence of two subscribing witnesses, on this 14th day of October, A. D. 1892.

EDWARD DILLINGHAM.

Witnesses:
 FRANK G. PARKER,
 GALEN COFFIN.